United States Patent [19]

St. Julian

[11] Patent Number: 4,910,061

[45] Date of Patent: Mar. 20, 1990

[54] SHOE HEEL SAVING PAD

[76] Inventor: Meldridge St. Julian, 1143 W. 111th St., Los Angeles, Calif. 90044

[21] Appl. No.: 348,373

[22] Filed: May 8, 1989

[51] Int. Cl.$^4$ .......................... B32B 3/02; B32B 3/26; B32B 33/00
[52] U.S. Cl. ..................................... 428/95; 428/126; 428/128; 428/213; 428/304.4
[58] Field of Search ................ 428/95, 126, 127, 128, 428/213, 304.4

[56] References Cited

U.S. PATENT DOCUMENTS 4,579,764  4/1986  Peoples, Jr. et al. ................ 428/95
4,748,063  5/1988  Reuben ................................. 428/95

Primary Examiner—William J. Van Balen
Attorney, Agent, or Firm—Erik M. Arnhem

[57] ABSTRACT

A resilient pad positionable on the floor of an automobile below and slightly behind the driver's accelerator pedal. When a woman is driving the automobile the heel of her shoe will engage the upper face of the pad while she is applying foot pressure to the accelerator pedal. The rear edge of the heel will sink into the pad surface, such that a large pad area will exert a relatively low unit area reaction force against the shoe heel. The invention minimizes premature wearing away of the shoe heel that can occur, over time, when the rear edge of the shoe heel is repeatedly pressed down against a relatively rigid automobile floor surface.

5 Claims, 1 Drawing Sheet

U.S. Patent    Mar. 20, 1990    4,910,061
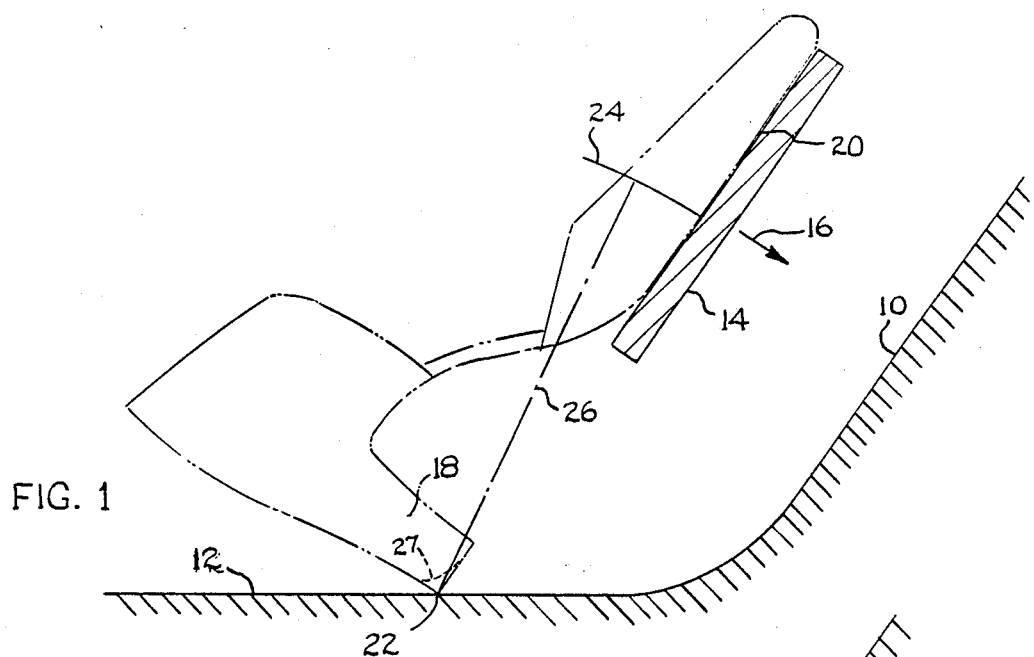
FIG. 1
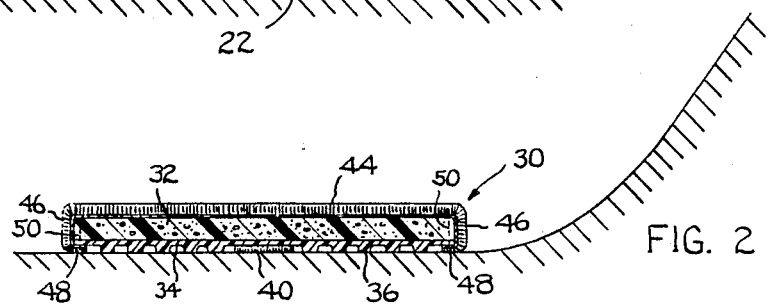
FIG. 2
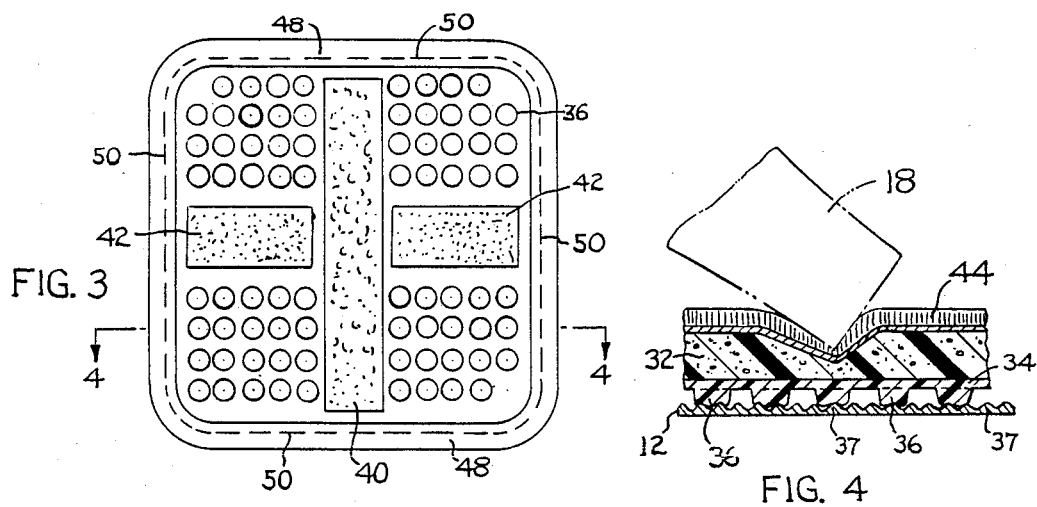
FIG. 3
FIG. 4

SHOE HEEL SAVING PAD

BACKGROUND AND SUMMARY OF THE INVENTION

This invention relates to a pad structure installable on the floor of an automobile in near adjacency to the driver's accelerator pedal. The pad structure is designed to absorb forces developed by a woman driver when she presses her foot down on the pedal. Such forces can, over time, cause the heel area of the woman's shoe to wear away prematurely, i.e. prior to other shoe surfaces. The present invention provides a pad structure that distributes and absorbs forces associated with shoe pressure on an accelerator pedal, thereby reducing shoe heel wear and preserving shoe life.

THE DRAWINGS

FIG. 1 is a side elevational view of a conventional automotive floorboard and accelerator pedal arrangement. A woman's high heel shoe is shown in engagement with the pedal.

FIG. 2 is a fragmentary view in the same direction as FIG. 1, but showing a pad of the present invention positioned on the floorboard.

FIG. 3 is a bottom plan view of the pad shown in FIG. 2.

FIG. 4 is an enlarged fragmentary sectional view through the FIG. 2 pad.

DESCRIPTION OF A PREFERRED EMBODIMENT OF THE INVENTION

FIG. 1 shows a conventional automobile floorboard that includes an inclined floor section 10 and a horizontal floor section 12. An accelerator pedal 14 is located above the floorboard for downward movement in the direction of arrow 16. Downward movement of pedal 14 is accomplished by foot pressure applied to the upper face of the pedal. FIG. 1 shows in phantom lines a woman's high heel shoe in position to apply downward pressure on pedal 14.

The woman driver will commonly position her right foot so that heel area 18 of her shoe is forcibly engaged with horizontal floor section 12, while sole area 20 of the shoe has pressure contact with the pedal surface. The rear edge 22 of heel area 18 will act as a fulcrum (pivot) as the shoe sole moves in an arc 24 around the heel rear edge. Numeral 26 denotes a radius line for imaginary arc 24.

Heel rear edge 22 has a very small contact area with floor surface 12; the contact is essential line contact. Accordingly, the unit area pressure at heel edge 22 is relatively high. Floor surface 12 will usually be either a carpeted surface or a hard rubber surface. The sub-surface below the carpet or hard rubber material is steel. Therefore, floor surface 12 is not well suited for distributing or absorbing the downward force generated by heel edge 22. Over a period of time the heel edge 22 wears away so that the heel assumes a rounded condition, as shown by dashed lines 27 in FIG. 1. Also, a small depression is sometimes formed in floor surface 12 (when the heel repeatedly digs into the same spot on the floor surface.)

FIGS. 2 through 4 show a pad 30 structure that I have devised to prevent the "rounded heel" condition depicted in FIG. 1. The illustrated pad is adapted to be positioned on the horizontal section 12 of the floorboard in the zone just behind accelerator pedal 14. Heel 18 of the woman driver's shoe will engage the pad approximately in the center of the pad, although it is not necessary that the heel engagement point be exactly on the pad center; essentially any point inwardly from the pad peripheral edge is acceptable.

Pad 30 may be of various different sizes. As shown in FIGS. 2 and 3, the pad has a square configuration about five inches on a side. The pad can be larger if desired. A larger pad has a greater surface area in contact with floor surface 12, such that the pad is less likely to slip on the floor surface. A smaller pad has a lower manufacturing cost.

The pad 30 cross section includes a relatively thick resilient panel 32, preferably formed out of foam rubber or foamed plastic; alternately a thick felt material can be used. The lower face of panel 32 is adhesively attached to a relatively thin flexible backing sheet 34 preferably formed of a thermoplastic material. Foam (felt) panel 32 has a preferred thickness of about one fourth inch. Backing sheet 34 is much thinner, e.g. about 0.05 or 0.10 inch.

As shown in FIGS. 3 and 4, backing sheet 34 has a series of relatively small deformable elastic buttons 36 extending downwardly from its lower face. These deformable buttons are designed to grip the floor 12 surface so as to prevent pad 30 from slipping out of position, especially during periods when the driver is applying foot pressure to the accelerator pedal 14.

Floor surface 12 can vary from one automobile to another. In some cases the floor surface will be a carpeted surface having a short fuzzy nap surface that is relatively slippery. In other cases, floor surface 12 will be a smooth plastic material that is also rather slippery. Alternately, floor surface 12 can be a ribbed surface having parallel ridges extending transversely across the direction taken by the person's foot. FIG. 4 shows a floor surface 12 having transversely extending ridges 37. The lower faces of buttons 36 on backing sheet 34 will engage the ridges to keep pad 30 from slipping on the floor surface.

In preferred practice of my invention at least two different types of gripper mechanisms will be carried on backing sheet 34, such that a given pad structure can be used in a variety of different automobiles, i.e. carpeted surfaces, smooth plastic surfaces, or ridged surfaces. FIG. 3 shows the aforementioned deformable gripper buttons 36 on four segments of the backing sheet lower face. Additionally, there is a transverse strip 40 of miniature hook material adhesively attached to the lower face of backing sheet 34. Strip 40 is obtainable commercially under the tradename "Velcro". A third gripper mechanism comprises two strips 42 having a pressure-sensitive adhesive on their lower (exposed) faces.

The three different gripper mechanisms 36, 40 and 42 are designed to provide a range of different actions, such that pad 30 can be effectively retained in place on a variety of different automobile floor surfaces. Buttons 36 are particularly effective on ridged surfaces. Contact adhesive strips 42 are effective on smooth plastic surfaces. Miniature hook material 40 is effective o carpeted surfaces (the miniature hooks lock onto the carpet fibers).

Pad 30 includes a covering sheet 44, preferably formed of fur (e.g. rabbit fur) or velvet; short nap carpet can also be used. The covering sheet includes a main top section overlying pad 32, a peripheral border section 46 extending downwardly along the peripheral edge of panel 32 and backing sheet 34, and an inturned lower section 48 extending from section 46 inwardly along the undersurface of sheet 34.

Covering sheet 44 may be secured to panel 32 and backing sheet 34 by means of stitches 50 that run along the peripheral edge of the pad, as shown in FIG. 3. Stitches 50 extend through the main top section and lower section 48 of the covering sheet, as well as the intervening panel 32 and backing sheet 34. As an alternative to stitching, adhesive bonding could be used.

FIG. 4 illustrates generally how the woman's shoe heel 18 interacts with pad 30. The rear edge of the heel applies a downward force on the pad, such that resilient panel 32 deforms. Covering 44 is placed in tension to absorb some of the heel force; compression of panel 32 also absorbs some of the force. The principal advantage of the pad 30 is that the pad reaction force against heel 18 is applied over an enlarged surface area of the heel (rather than along a single thin line, as in the FIG. 1 arrangement). The unit area force against heel 18 is relatively low, such that the heel does not become "rounded" as shown at 27 in FIG. 1.

A further advantage of pad 30 is the fact that it is removable from the floor surface. Should the pad develop a worn spot where it is repeatedly engaged by the woman's shoe heel, the pad can be repositioned so that a different area of the pad is presented to the heel rear edge. The pad does not need to be permanently fastened in place on the floor.

As seen in FIG. 4, covering sheet 44 has a large area contact with the surface of heel 18. Covering sheet 44 should therefore be formed of a material that will not scratch or scuff he heel surface. As noted previously, fur or velvet are preferred materials for covering sheet 44; these materials are relatively soft and non-abrasive.

Panel 32 is preferably a relatively thick resilient panel (e.g. at least about one quarter inch thick). A relatively stiff foam rubber can be used. Alternately, felt can be employed.

Backing sheet 34 is adhesively attached to panel 32, such that the lower face area of the panel is immobilized. The upper portion of panel 32 can deform downwardly (as shown in FIG. 4), but backing sheet 34 minimized lateral shifting of the panel 32 material, such that the downward heel force is applied over a relatively large pad area.

The drawings show one form that the invention can take. Other forms are possible.

I claim:

1. A pad for positionment on the floorboard of an automobile behind the accelerator pedal; said pad comprising a relatively thick resilient panel having an upper face and a lower face; a relatively thin flexible backing sheet adhered to the lower face of said resilient panel; floor gripper means carried on the lower face of said backing sheet for retaining the pad in a fixed position on the floorboard; and a flexible covering sheet overlying the upperface of the resilient panel; said covering sheet including a main top section, a border section extending downwardly along the peripheral edge of the panel and backing sheet, and an inturned lower section extending from the border section a short distance along the undersurface of the backing sheet.

2. The pad of claim 1 wherein said covering sheet is made from a material selected from the group consisting of fur and velvet.

3. The pad of claim 2, and further comprising stitching extending completely through the pad along the panel peripheral edge so as to secure the covering sheet to the resilient panel and backing sheet; said stitching extending through the main top section and the inturned lower section of the covering sheet.

4. The pad of claim 1 wherein said floor gripper means comprises at least two different gripper mechanisms carried on different sections of the backing sheet lower face; one of said gripper mechanisms comprising a strip of miniature loop material adapted to interlock with the fibers of conventional automobile floor carpeting; the other gripper mechanism comprising a multiplicity of relatively small deformable elastic buttons formed integrally with the backing sheet.

5. The pad of claim 1 wherein said resilient panel is formed of foam rubber.

* * * * *